(12) United States Patent
Lai et al.

(10) Patent No.: US 10,296,115 B2
(45) Date of Patent: May 21, 2019

(54) TOUCH DISPLAY APPARATUS

(71) Applicant: AU OPTRONICS CORP., Hsin-Chu (TW)

(72) Inventors: Chun-Chi Lai, Hsin-Chu (TW); Chee-Wai Lau, Hsin-Chu (TW); Feng-Sheng Lin, Hsin-Chu (TW); Yi-Ru Su, Hsin-Chu (TW); Chi-Chun Liao, Hsin-Chu (TW); Rong-Ann Lin, Hsin-Chu (TW); Chia-Ping Lu, Hsin-Chu (TW); An-Hsiung Hsieh, Hsin-Chu (TW); Pei-Yu Chen, Hsin-Chu (TW); Tsang Hong Wang, Hsin-Chu (TW); Tzu-Chi Tseng, Hsin-Chu (TW); Chung-Hao Cheng, Hsin-Chu (TW); Hsu Sheng Hsu, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 368 days.

(21) Appl. No.: 15/082,511

(22) Filed: Mar. 28, 2016

(65) Prior Publication Data

US 2016/0306478 A1 Oct. 20, 2016

(30) Foreign Application Priority Data

Apr. 16, 2015 (TW) .............................. 104112239 A

(51) Int. Cl.
*G06F 3/041* (2006.01)
(52) U.S. Cl.
CPC ................................. *G06F 3/0412* (2013.01)
(58) Field of Classification Search
CPC .............. G06F 3/0412; G06F 3/044; G06F 2203/04103; G06F 3/0416; G02F 1/13338
See application file for complete search history.

(56) References Cited

U.S. PATENT DOCUMENTS 8,217,916 B2 * 7/2012 Anno ...................... G06F 3/044
345/174
8,330,734 B2 * 12/2012 Oohira .............. G02F 1/133308
345/173

(Continued)

FOREIGN PATENT DOCUMENTS

| CN | 104049802 A | 9/2014 |
| JP | H07192574 | 7/1995 |
| TW | 201504900 | 2/2015 |

OTHER PUBLICATIONS

Taiwan Intellectual Property Office (TIPO), Office Action dated Jun. 27, 2016.

(Continued)

*Primary Examiner* — Jose R Soto Lopez
(74) *Attorney, Agent, or Firm* — WPAT, PC

(57) ABSTRACT

A touch display apparatus having a fan-out side is provided. The touch display apparatus includes a first substrate, a second substrate, a touch sensing element and a display element. The first and the second substrate have a first surface and a second inner surface, respectively. The second substrate is disposed opposite to the first substrate. The second inner surface faces the first inner surface. The second substrate has a convex part and a concave part on the fan-out side. The second inner surface has a second outer lead bonding region in the convex part. The first outer lead bonding region of the first substrate is unshielded by the second substrate through the concave part. The second outer lead bonding region of the second substrate is unshielded by the first substrate. The touch sensing element and the display element are packaged in between the first and the second substrates.

13 Claims, 9 Drawing Sheets

(56) References Cited

U.S. PATENT DOCUMENTS

| | | | | |
|---|---|---|---|---|
| 8,564,550 B2* | 10/2013 | Hashimoto | ............ | G06F 3/0418 345/173 |
| 8,624,856 B2* | 1/2014 | Kim | ............ | G02F 1/13338 345/173 |
| 8,830,195 B2* | 9/2014 | Eom | ............ | H01L 27/323 345/173 |
| 8,878,815 B2* | 11/2014 | Suzuki | ............ | G06F 3/044 345/174 |
| 9,001,078 B2* | 4/2015 | Azumi | ............ | G06F 3/0412 345/173 |
| 9,052,774 B2* | 6/2015 | Matsumoto | ............ | G06F 3/0416 |
| 9,084,368 B2* | 7/2015 | Tsai | ............ | G06F 1/1626 |
| 9,214,507 B2* | 12/2015 | Mathew | ............ | H05B 33/0896 |
| 9,223,429 B2* | 12/2015 | Liu | ............ | G06F 1/169 |
| 9,229,570 B2* | 1/2016 | Choi | ............ | G06F 3/0416 |
| 9,372,569 B2* | 6/2016 | Teramoto | ............ | G06F 3/0412 |
| 9,507,196 B2* | 11/2016 | Kurasawa | ............ | G02F 1/13338 |
| 9,513,733 B2* | 12/2016 | Choi | ............ | G06F 3/0412 |
| 9,535,522 B2* | 1/2017 | Ahn | ............ | G06F 3/041 |
| 9,594,406 B2* | 3/2017 | Yamada | ............ | G06F 3/044 |
| 9,645,430 B2* | 5/2017 | Nakano | ............ | G02F 1/13338 |
| 9,671,887 B2* | 6/2017 | Furutani | ............ | G09G 3/36 |
| 9,710,084 B2* | 7/2017 | Kim | ............ | G06F 3/0412 |
| 9,740,331 B2* | 8/2017 | Anno | ............ | G06F 3/044 |
| 9,743,518 B2* | 8/2017 | Eom | ............ | H01L 27/323 |
| 9,791,973 B2* | 10/2017 | Kurasawa | ............ | G06F 3/0418 |
| 9,857,905 B2* | 1/2018 | Kurasawa | ............ | G06F 3/044 |
| 9,921,424 B2* | 3/2018 | Oohira | ............ | G02F 1/13338 |
| 9,927,646 B2* | 3/2018 | Watanabe | ............ | G02F 1/13338 |
| 9,939,954 B2* | 4/2018 | Anno | ............ | G06F 3/044 |
| 9,952,701 B2* | 4/2018 | Kurasawa | ............ | G06F 3/044 |
| 2008/0158467 A1* | 7/2008 | Tseng | ............ | G02F 1/1333 349/58 |
| 2009/0109369 A1* | 4/2009 | Morishita | ............ | G02F 1/133308 349/58 |
| 2009/0115743 A1* | 5/2009 | Oowaki | ............ | G06F 3/0412 345/174 |
| 2009/0195516 A1* | 8/2009 | Kuo | ............ | G06F 3/0412 345/174 |
| 2013/0093726 A1 | 4/2013 | Kuo et al. | | |
| 2014/0009400 A1* | 1/2014 | Poorter | ............ | G06F 3/041 345/173 |
| 2014/0184059 A1* | 7/2014 | Masuda | ............ | H01L 51/5246 313/512 |
| 2014/0217373 A1* | 8/2014 | Youn | ............ | H01L 23/4985 257/40 |
| 2014/0307396 A1* | 10/2014 | Lee | ............ | H05K 1/028 361/749 |
| 2015/0022483 A1* | 1/2015 | Lai | ............ | G06F 3/044 345/174 |

OTHER PUBLICATIONS

State Intellectual Property Office of the People's Republic of China, "Office Action", dated Aug. 25, 2017.

* cited by examiner

TOUCH DISPLAY APPARATUS

TECHNICAL FIELD

The present disclosure relates to a touch display apparatus, and more particularly to a touch display apparatus having a slimmer border.

BACKGROUND

For electronic devices with touch functions, having slim structures is the current trend in current years. To make the electronic device slimmer and lighter, the touch display in the electronic device must have a reduced thickness. Conventionally, a touch display is composed by a display device and an external touch component electrically coupled with each other. Because the touch component is externally and electrically coupled to the display device, the arrangement of the wiring outlet of the touch component is not affected by the structure of the display device and the wiring outlet and the display device can be disposed on the same side.

In order to make electronic device slimmer and lighter, an in-cell touch display is developed currently. In an in-cell touch display, the touch component is built in the display device and accordingly the touch display has reduced thickness. However, because the touch component is built in the display device, the touch component needs an electrically-coupled substrates and through which to electrically couple to the external electronic components. In addition, because the outer lead bonding (OLB) region of the upper substrate and the lower substrate of the in-cell touch display are both disposed on the inner surfaces of the substrates, the outer lead bonding region must avoid to be shielded by the substrates so that the touch component and other related internal electronic components can be electrically connected to the external circuits successfully. Thus, the upper substrate and the lower substrate of the in-cell touch display must be arranged on different sides. However, when the outer lead bonding regions of the upper substrate and the lower substrate are arranged on different sides, the electronic device has significantly increasing border area for layout. In addition, because the changes of wiring, the arrangement and wiring of other electronic components in the electronic device have more restrictions and consequentially the design of the electronic device is more difficult.

SUMMARY

The present disclosure provides a touch display apparatus having a fan-out side. The touch display apparatus includes a first substrate, a second substrate, a touch sensing element and a display element. The first substrate has a first inner surface. The first inner surface has a first outer lead bonding region on the fan-out side. The second substrate is disposed opposite to the first substrate and has a second inner surface. The second inner surface faces the first inner surface. The second substrate has a convex part and a concave part on the fan-out side. The convex part and the concave part are adjacent with each other. The second inner surface has a second outer lead bonding region in the convex part. The first outer lead bonding region of the first substrate is unshielded by the second substrate through the concave part. The convex part is convex or protrudes relative to the first substrate, and the second outer lead bonding region of the second substrate is unshielded by the first substrate. The touch sensing element is disposed on the second inner surface of the second substrate and electrically connected to the second outer lead bonding region. The display element is disposed on the first inner surface of the first substrate and electrically connected to the first outer lead bonding region.

The present disclosure further provides a touch display apparatus having a fan-out side. The touch display apparatus includes a first substrate, a second substrate, a touch sensing element and a display element. The first substrate has a first inner surface. The first inner surface has a first outer lead bonding region on the fan-out side. The first substrate further has at least one first concave part adjacent to the first outer lead bonding region. The second substrate is disposed opposite to the first substrate and has a second inner surface. The second inner surface faces the first inner surface. The second substrate has a second concave part on the fan-out side. The second inner surface has at least one second outer lead bonding region. The first outer lead bonding region of the first substrate is unshielded by the second substrate through the second concave part, and the at least one second outer lead bonding region of the second substrate is unshielded by the first substrate through the at least one first concave part. The touch sensing element is disposed on the second inner surface of the second substrate and electrically connected to the at least one second outer lead bonding region. The display element is disposed on the first inner surface of the first substrate and electrically connected to the first outer lead bonding region.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
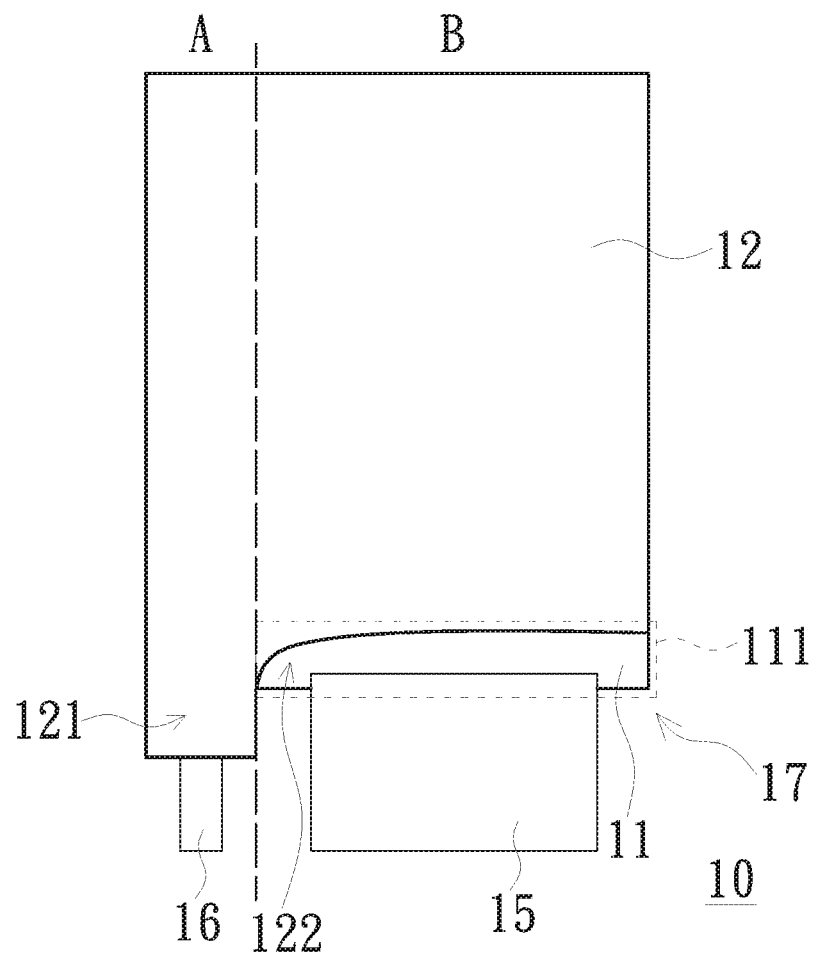
FIG. 1A is a top view of a touch display apparatus in accordance with the first embodiment of the present disclosure.
Figure 1B:
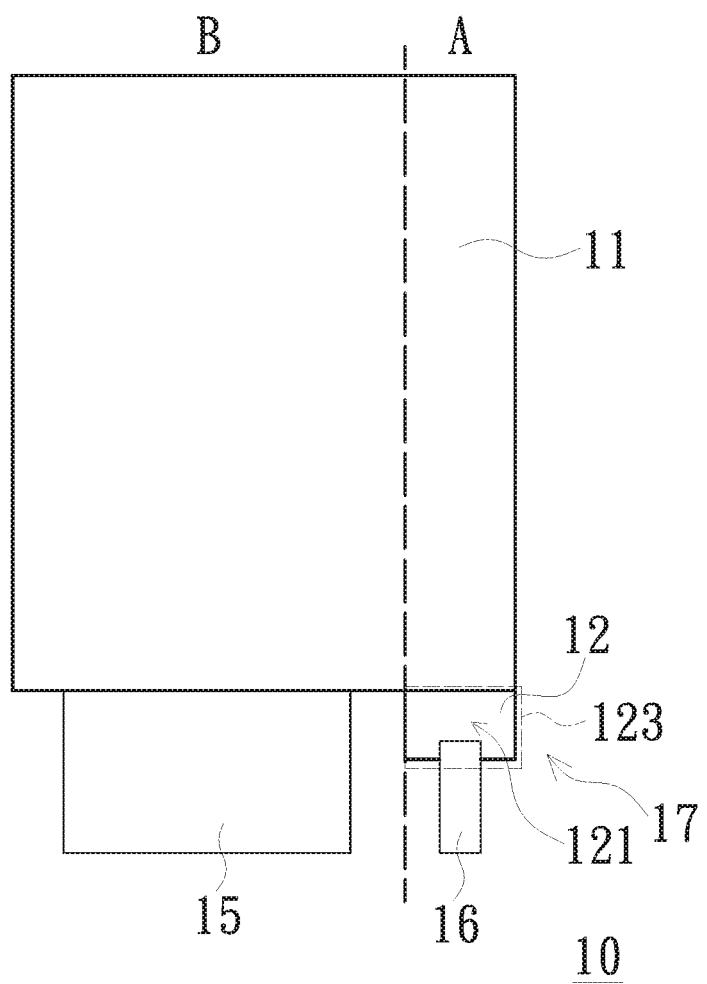
FIG. 1B is another top view of the touch display apparatus in accordance with the first embodiment of the present disclosure.
Figure 2A:
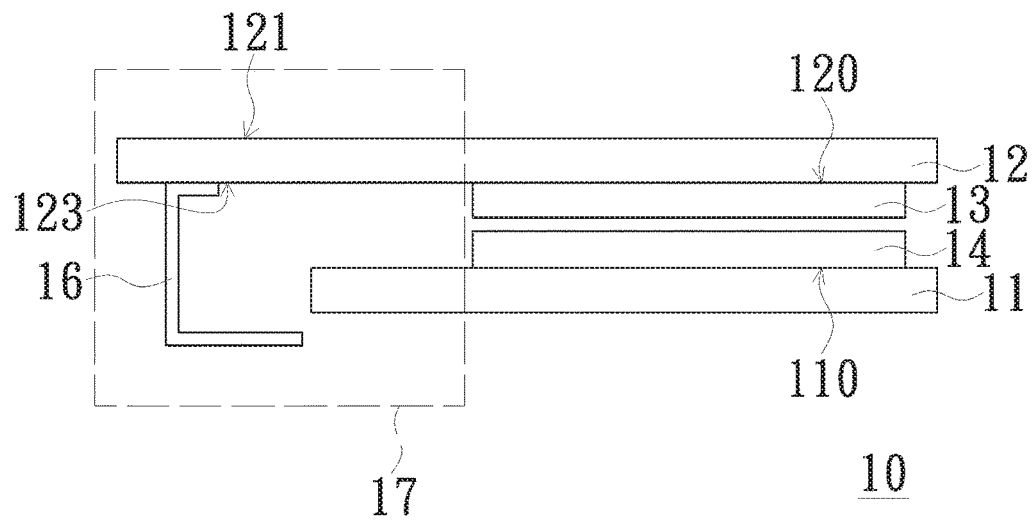
FIG. 2A is a cross-sectional view of the region A in FIGS. 1A, 1B.
Figure 2B:
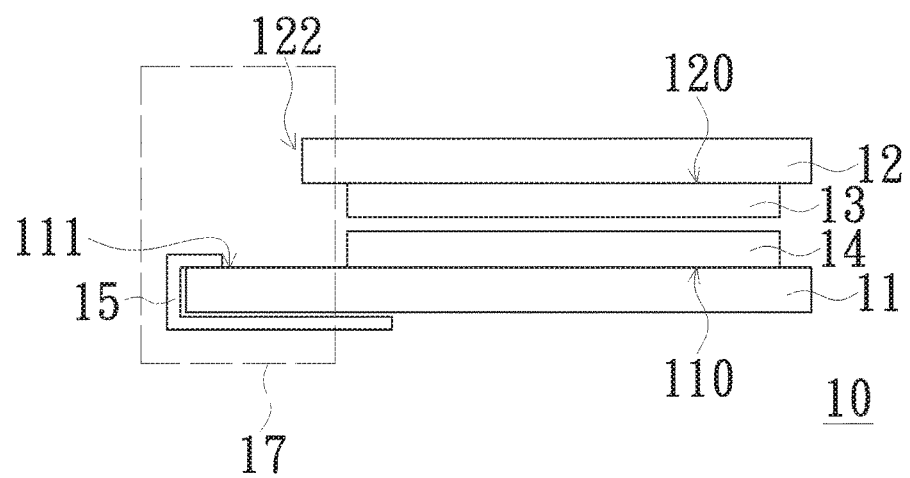
FIG. 2B is a cross-sectional view of the region B in FIGS. 1A, 1B.

Please refer to FIGS. 1A, 1B, 2A and 2B, which are schematic diagrams of a touch display apparatus 10 in accordance with the first embodiment of the present disclosure. As shown in FIGS. 2A and 2B, the touch display apparatus 10 in the present embodiment includes a first substrate 11, a second substrate 12, a touch sensing element 13 and a display element 14. The first substrate 11 has a first inner surface 110. The second substrate 12 is opposite to the first substrate 11. The second substrate 12 has a second inner surface 120, and the second inner surface 120 faces the first inner surface 110. The touch sensing element 13 is disposed on the second inner surface 120 of the second substrate 12. The touch sensing element 13 may be a touch sensing circuit, which is configured to detect a surface of the touch display apparatus 10 is being touched or not. The display element 14 is disposed on the first inner surface 110 of the first substrate 11. The display element 14 may be an organic light-emitting diode (OLED) display element. The first substrate 11 and the second substrate 12 may be made of glass. The first substrate 11 and the second substrate 12 are used for packaging the touch sensing element 13 and the display element 14 in between the first substrate 11 and the second substrate 12, so to form an in-cell touch display apparatus 10. In other embodiments, the display element 14 may be a liquid crystal (LC) display element or an electrophoretic display element, and the first substrate 11 and the second substrate 12 may be made of plastic or other suitable material.

FIG. 1A is a top view of the touch display apparatus 10 of the present embodiment in a direction from the second substrate 12 to the first substrate 11. FIG. 1B is a top view of the touch display apparatus 10 of the present embodiment in a direction from the first substrate 11 to the second substrate 12. Please refer to FIG. 1A first. As shown, the first inner surface 110 (FIGS. 2A, 2B) of the first substrate 11 has a first outer lead bonding region 111. The first outer lead bonding region 111 is provided on a fan-out side 17 and electrically connected to the display element 14 (FIGS. 2A, 2B). The second substrate 12 has a convex part 121 and a first concave part 122 on the fan-out side 17, in which the convex part 121 and the first concave part 122 are adjacent with each other. The convex part 121 is convex and protrudes relative to an edge of the first substrate 11. The first concave part 122 is concave relative to the edge of the first substrate 11 so that the first outer lead bonding region 111 is exposed and is not shielded by the second substrate 12. Thus, a first flexible circuit board 15 can be electrically connected to a bonding pad (not shown) in the first outer lead bonding region 111 by way of heat pressing and the display element 14 can be electrically connected to other external circuits or electronic components through the first flexible circuit board 15. In other embodiments, the first concave part 122 may be rectangular or have other shapes able to expose the first outer lead bonding region 111. In the present embodiment, the first concave part 122 has an arc shape. Thus, compared with having a rectangular shape, the first concave part 122 in the present embodiment can reduce the cut area of the second substrate 12 and the first concave part 122 can reduce the stress concentration at the corner.

Next, please refer to FIG. 1B. As shown, the convex part 121 of the second substrate 12 is convex and protrudes relative to the edge of the first substrate 11 and has a second outer lead bonding region 123. The second outer lead bonding region 123 is electrically connected to the touch sensing element 13 (FIGS. 2A, 2B). Because the second outer lead bonding region 123 is convex and protrudes relative to the edge of the first substrate 11, the second outer lead bonding region 123 is exposed and is not shielded by the first substrate 11. Thus, a second flexible circuit board 16 can be electrically connected to a bonding pad (not shown) in the second outer lead bonding region 123 by way of heat pressing and the touch sensing element 13 can be electrically connected to other external circuits or electronic components through the second flexible circuit board 16.

FIG. 2A is a cross-sectional view of the region A in FIGS. 1A, 1B and FIG. 2B is a cross-sectional view of the region B in FIGS. 1A, 1B. Please refer to FIG. 2A first. In the region A, because the convex part 121 of the second substrate 12 is convex and protrudes relative to the edge of the first substrate 11, the second flexible circuit board 16 can be electrically connected to the second outer lead bonding region 123 and the touch sensing element 13 can be electrically connected to other external circuits or electronic components through the second flexible circuit board 16. Next, please refer to FIG. 2B. In the region B, because the second substrate 12 has the first concave part 122 on the fan-out side 17, the first outer lead bonding region 111 is convex and protrudes relative to an edge of the second substrate 12, thus, is not shielded by the second substrate 12. Thus, the first flexible circuit board 15 can be electrically connected to the first outer lead bonding region 111 and the display element 14 can be electrically connected to other external circuits or electronic components through the first flexible circuit board 15. In summary, because the second substrate 12 in the present embodiment has the convex part 121 and the first concave part 122, the first outer lead bonding region 111 of the first substrate 11 and the second outer lead bonding region 123 of the second substrate 12 are not shielded by the second substrate 12 and the first substrate 11, respectively. Thus, the touch display apparatus 10 has a relatively slim structure and a relatively narrow border area.

Figure 3A:
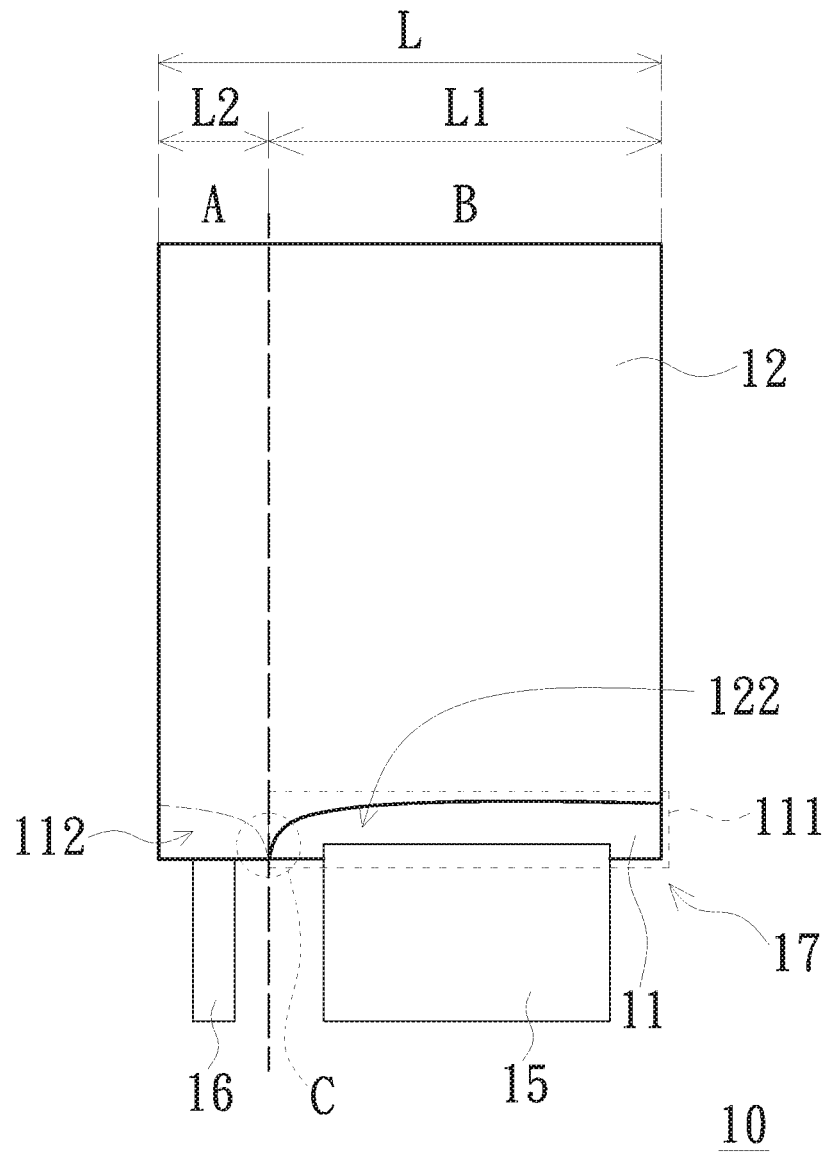
FIG. 3A is a top view of a touch display apparatus in accordance with the second embodiment of the present disclosure.
Figure 3B:
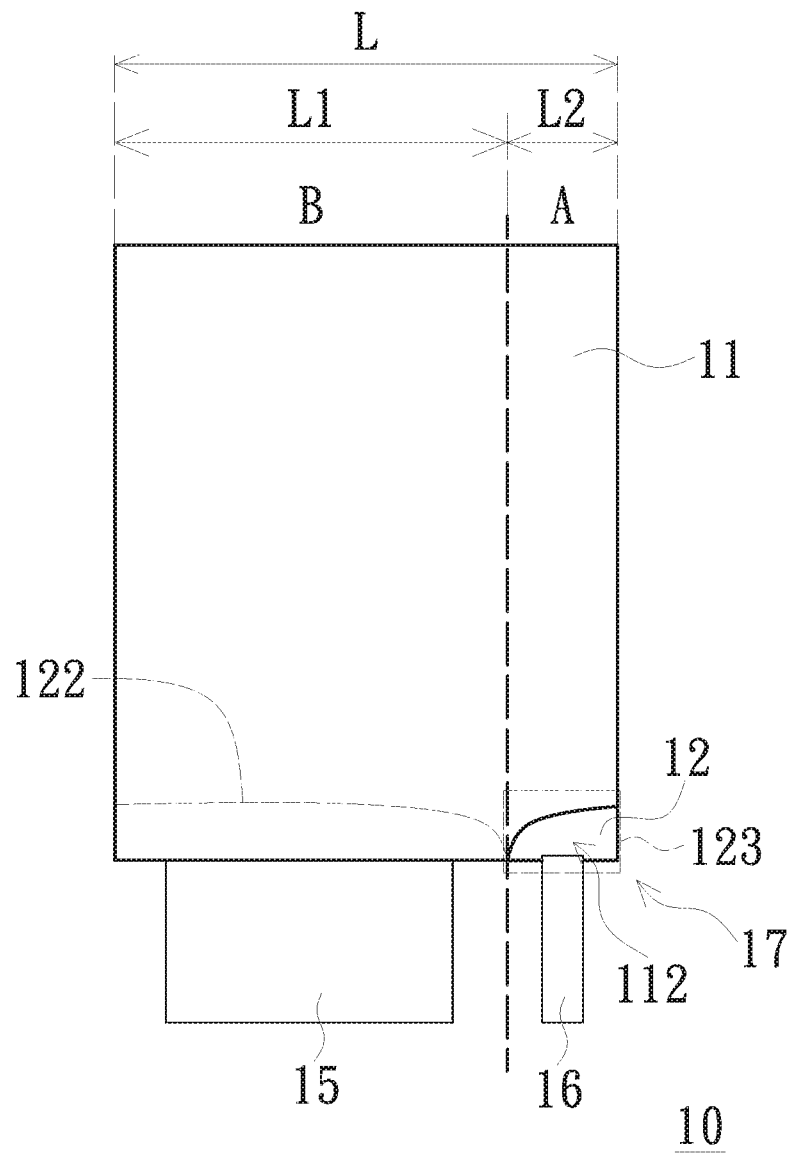
FIG. 3B is another top view of the touch display apparatus in accordance with the second embodiment of the present disclosure.
Figure 4A:
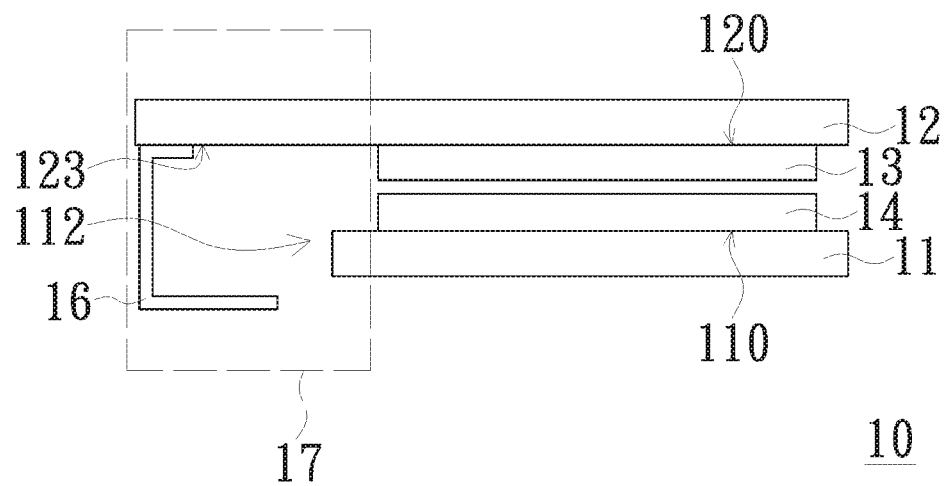
FIG. 4A is a cross-sectional view of the region A in FIGS. 3A, 3B.
Figure 4B:
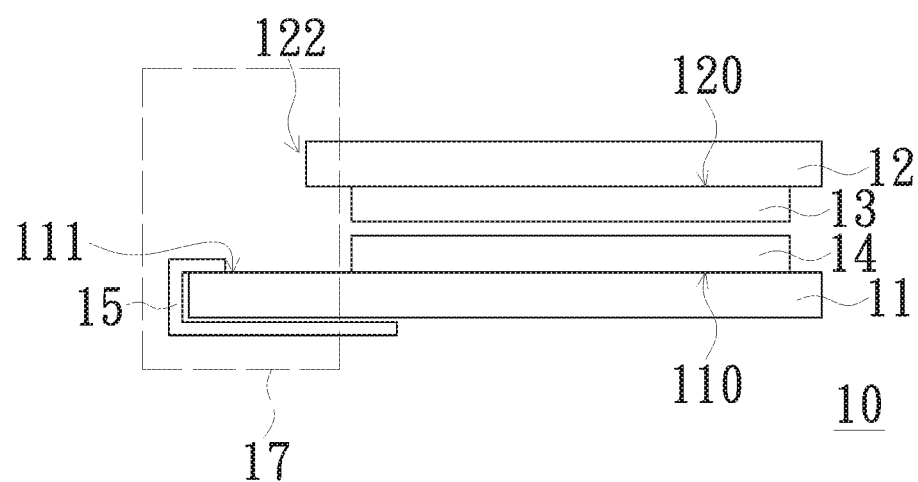
FIG. 4B is a cross-sectional view of the region B in FIGS. 3A, 3B.

Please refer to FIGS. 3A, 3B, 4A and 4B, which are schematic diagrams of a touch display apparatus 10 in accordance with the second embodiment of the present disclosure. Specifically, FIG. 3A is a top view of the touch display apparatus 10 of the present embodiment in a direction from the second substrate 12 to the first substrate 11. FIG. 3B is a top view of the touch display apparatus 10 of the present embodiment in a direction from the first substrate 11 to the second substrate 12. Please refer to FIG. 3A first. As shown, the first inner surface 110 (FIGS. 4A, 4B) of the first substrate 11 has the first outer lead bonding region 111. The first outer lead bonding region 111 is provided on the fan-out side 17 and electrically connected to the display element 14 (FIGS. 4A, 4B). The second substrate 12 has the first concave part 122. The first concave part 122 is concave relative to the edge of the first substrate 11 so that the first outer lead bonding region 111 is exposed and is not shielded by the second substrate 12. Thus, the first flexible circuit board 15 can be electrically connected to a bonding pad (not shown) in the first outer lead bonding region 111 by way of heat pressing and the display element 14 can be electrically connected to other external circuits or electronic components through the first flexible circuit board 15.

Next, please refer to FIG. 3B. As shown, the first substrate 11 has a second concave part 112 on the fan-out side 17. The second concave part 112 is adjacent to the orthogonal projection of the first concave part 122 on the first substrate 11. The second concave part 112 is concave relative to an edge of the second substrate 12 so that a second outer lead bonding region 123 of the second substrate 12 is exposed and not shielded by the first substrate 11. The second outer lead bonding region 123 is electrically connected to the touch sensing element 13 (FIGS. 4A, 4B). Because the second outer lead bonding region 123 is exposed by the second concave part 112, the second outer lead bonding region 123 is not shielded by the first substrate 11. Thus, the second flexible circuit board 16 can be electrically connected to the second outer lead bonding region 123 by way of heat pressing and the touch sensing element 13 can be bonded and electrically connected to other external circuits or electronic components through the second flexible circuit board 16. In other embodiments, the first concave part 122 and the second concave part 112 may be rectangular or have other shapes able to expose the first outer lead bonding region 111 and the second outer lead bonding region 123, respectively. In the present embodiment, the first concave part 122 and the second concave part 112 have arc shapes. Thus, the first concave part 122 and the second concave part 112 in the present embodiment can reduce the cut areas of the first substrate 11 and the second substrate 12 and also reduce the stress concentration at the corners, respectively. In other embodiments, the sum of a width L1 of the first concave part 122 and a width L2 of the second concave part 112 may be smaller than a width L of the fan-out side 17 of the touch display apparatus 10. In the present embodiment, the sum of the width L1 of the first concave part 122 and the width L2 of the second concave part 112 is equal to the width L of the fan-out side 17 of the touch display apparatus 10; that is, the orthogonal projection of the second concave part 112 on the second substrate 12 is tangent to the first concave part 122 (the area C of FIG. 3A). Thus, the first concave part 122 and the second concave part 112 have a maximum wiring space.

FIG. 4A is a cross-sectional view of the region A in FIGS. 3A, 3B and FIG. 4B is a cross-sectional view of the region B in FIGS. 3A, 3B. Please refer to FIG. 4A first. In the region A, because the second outer lead bonding region 123 disposed on the second inner surface 120 of the second substrate 12 is exposed by the second concave part 112 and not shielded by the first substrate 11, the second flexible circuit board 16 can be electrically connected to the second outer lead bonding region 123 and the touch sensing element 13 can be electrically connected to other external circuits or electronic components through the second flexible circuit board 16. Next, please refer to FIG. 4B. In the region B, because the second substrate 12 has the first concave part 122 on the fan-out side 17, the first outer lead bonding region 111 is convex and protrudes relative to an edge of the second substrate 12 and not shielded by the second substrate 12. Thus, the first flexible circuit board 15 can be electrically connected to the first outer lead bonding region 111 and the display element 14 can be electrically connected to other external circuits or electronic components through the first flexible circuit board 15. In summary, because the second substrate 12 in the present embodiment has the first concave part 122 and the first substrate 11 in the present embodiment has the second concave part 112, the first outer lead bonding region 111 of the first substrate 11 and the second outer lead bonding region 123 of the second substrate 12 are not shielded by the second substrate 12 and the first substrate 11, respectively. Thus, the touch display apparatus 10 has a relatively slim structure and a relatively narrow border area. In addition, because the second substrate 12 in the present embodiment does not have the convex part, the risk of the convex part being damaged by external force when without having a protection of an external mechanical is reduced.

Figure 5A:
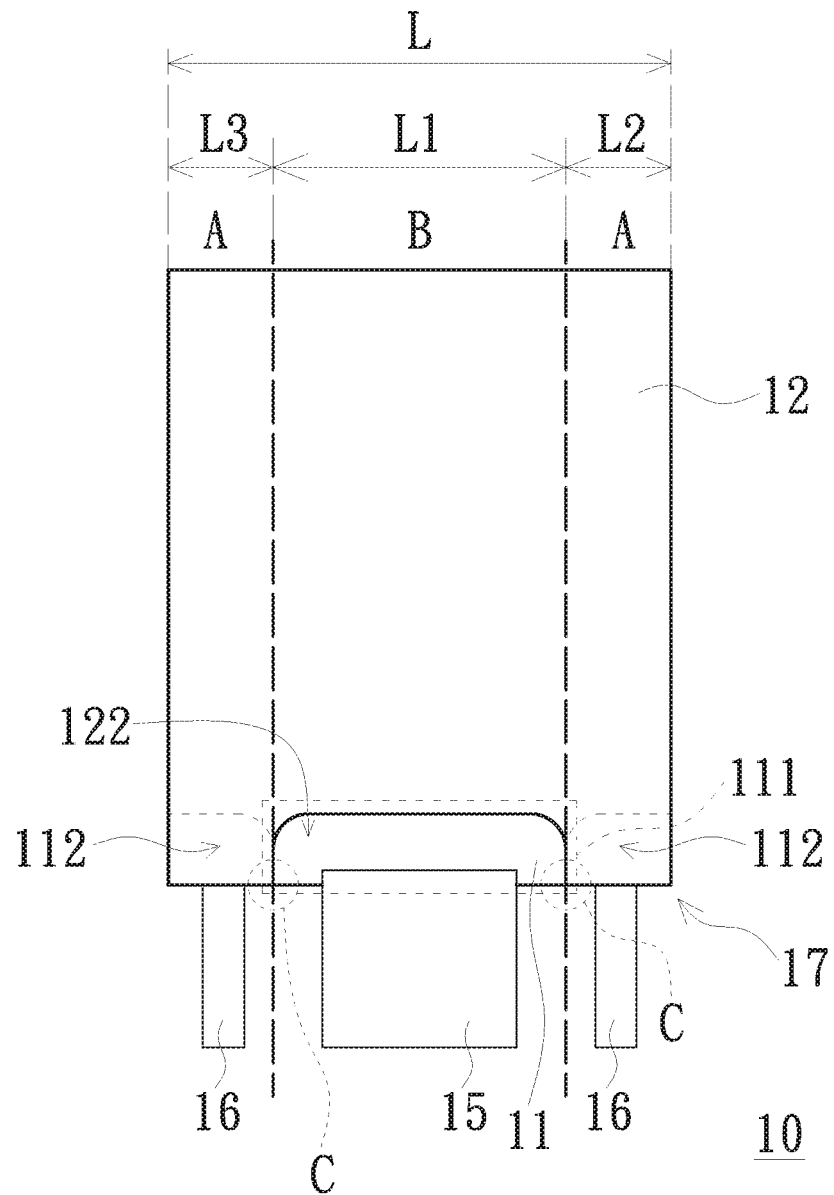
FIG. 5A is a top view of a touch display apparatus in accordance with the third embodiment of the present disclosure.
Figure 5B:
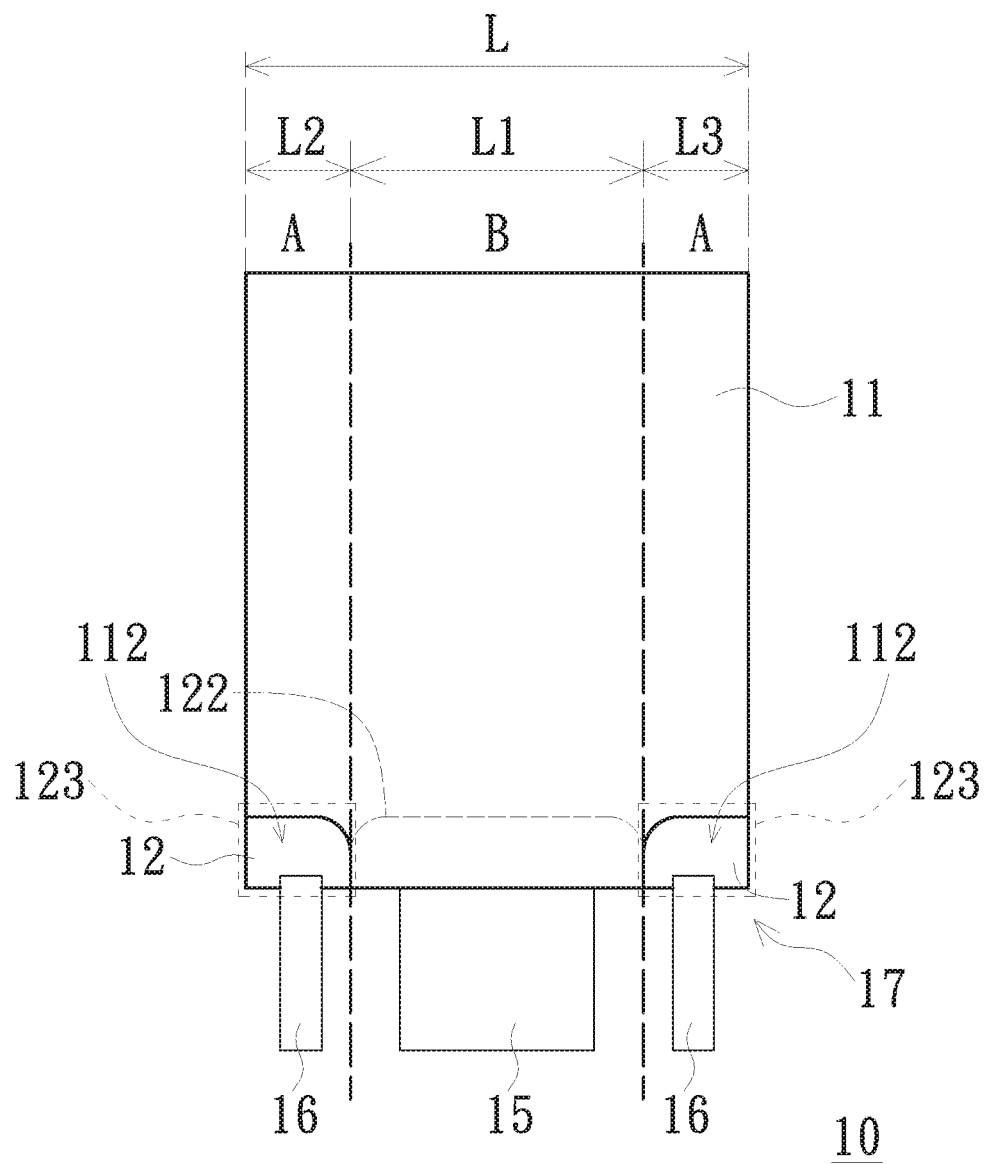
FIG. 5B is another top view of the touch display apparatus in accordance with the third embodiment of the present disclosure.
Figure 6A:
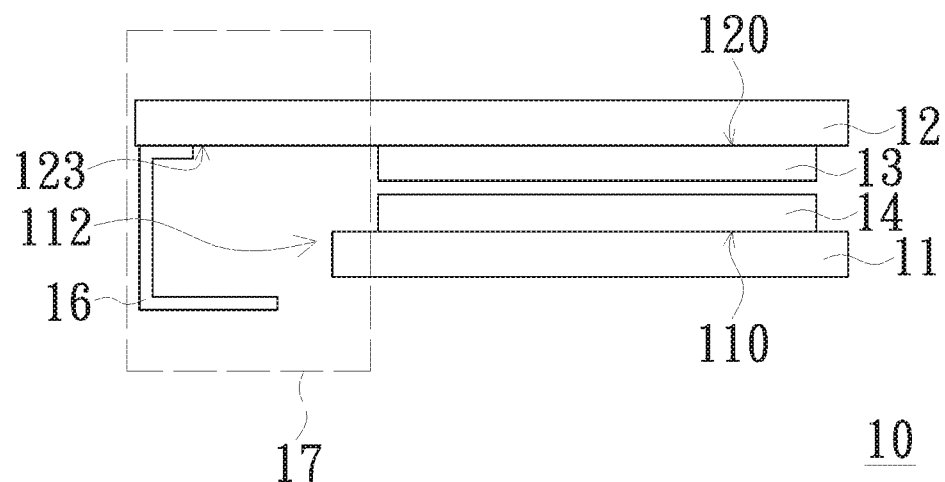
FIG. 6A is a cross-sectional view of the region A in FIGS. 5A, 5B.
Figure 6B:
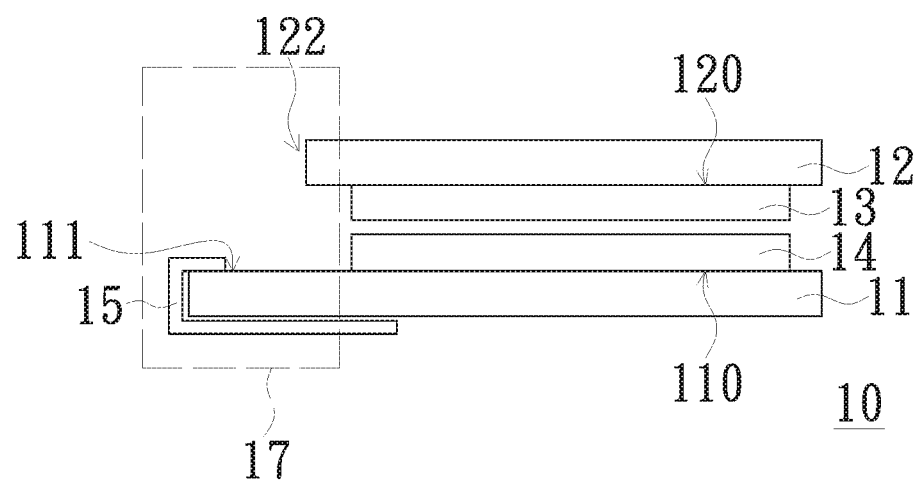
FIG. 6B is a cross-sectional view of the region B in FIGS. 5A, 5B.

Please refer to FIGS. 5A, 5B, 6A and 6B, which are schematic diagrams of a touch display apparatus 10 in accordance with the third embodiment of the present disclosure. Specifically, FIG. 5A is a top view of the touch display apparatus 10 of the present embodiment in a direction from the second substrate 12 to the first substrate 11. FIG. 5B is a top view of the touch display apparatus 10 of the present embodiment in a direction from the first substrate 11 to the second substrate 12. Please refer to FIG. 5A first. As shown, the first inner surface 110 (FIGS. 6A, 6B) of the first substrate 11 has the first outer lead bonding region 111. The first outer lead bonding region 111 is provided on the fan-out side 17 and electrically connected to the display element 14 (FIGS. 6A, 6B). The second substrate 12 has a first concave part 122. The first concave part 122 is provided on the fan-out side 17 and has a width L1. The first concave part 122 is concave relative to an edge of the first substrate 11 so that the first outer lead bonding region 111 is exposed and is not shielded by the second substrate 12. Thus, the first flexible circuit board 15 can be electrically connected to the first outer lead bonding region 111 by way of heat pressing and the display element 14 can be electrically connected to other external circuits or electronic components through the first flexible circuit board 15.

In other embodiments, the first substrate 11 may have a plurality of second concave parts 112. In the present embodiment, the first substrate 11 is exemplified by having two second concave parts 112. The two second concave parts 112 have widths L2 and L3, respectively. Please refer to FIG. 5B. As shown, the first substrate 11 has two second concave parts 112 on the fan-out side 17. Specifically, the two second concave parts 112 are disposed on the two sides of the orthogonal projection of the first concave part 122 on the first substrate 11, respectively. The two second concave parts 112 are concave relative to an edge of the second substrate 12 so that the two second outer lead bonding regions 123 of the second substrate 12 are exposed and not shielded by the first substrate 11. The two second outer lead bonding regions 123 are electrically connected to the touch sensing element 13 (FIGS. 6A, 6B). Because the two second outer lead bonding regions 123 are exposed by the two second concave parts 112, the two second outer lead bonding regions 123 are not shielded by the first substrate 11. Thus, the two second flexible circuit boards 16 can be electrically connected to the two second outer lead bonding regions 123 by way of heat pressing and the touch sensing element 13 can be electrically connected to other external circuits or electronic components through the two second flexible circuit boards 16. In other embodiments, the first concave part 122 and the second concave part 112 may be rectangular or have other shapes able to expose the first outer lead bonding region 111 and the second outer lead bonding region 123, respectively. In the present embodiment, the first concave part 122 and the second concave part 112 have arc shapes. Thus, the first concave part 122 and the second concave part 112 in the present embodiment can reduce the cut areas of the first substrate 11 and the second substrate 12 and also reduce the stress concentration at the corners, respectively. In other embodiments, the sum of the width L1 of the first concave part 122 and the widths L2, L3 of the two second concave parts 112 may be smaller than the width L of the fan-out side 17 of the touch display apparatus 10. In the present embodiment, the sum of the width L1 of the first concave part 122 and the widths L2, L3 of the two second concave parts 112 is equal to the width L of the fan-out side 17 of the touch display apparatus 10; that is, the orthogonal projections of the two second concave parts 112 on the second substrate 12 are tangent to the two ends of the first concave part 122, respectively (the area C of FIG. 5A). Thus, the first concave part 122 and the second concave part 112 have a maximum wiring space. Because the touch display apparatus 10 in the present embodiment has two or more second concave parts 112, the wires can be selectively routed to one of the second concave part 112 in response to a specific wiring requirement, and according the wiring in the present embodiment has improved convenience.

FIG. 6A is a cross-sectional view of the region A in FIGS. 5A, 5B and FIG. 6B is a cross-sectional view of the region B in FIGS. 5A, 5B. Please refer to FIG. 6A first. In the region A, because the second outer lead bonding region 123 disposed on the second inner surface 120 of the second substrate 12 is exposed by the second concave part 112 and not shielded by the first substrate 11, the second flexible circuit board 16 can be electrically connected to the second outer lead bonding region 123 and the touch sensing element 13 can be electrically connected to other external circuits or electronic components through the second flexible circuit board 16. Next, please refer to FIG. 6B. In the region B, because the second substrate 12 has the first concave part 122 on the fan-out side 17, the first outer lead bonding region 111 is convex and protrudes relative to the edge of the second substrate 12, thus, is not shielded by the second substrate 12. Thus, the first flexible circuit board 15 can be electrically connected to the first outer lead bonding region 111 and the display element 14 can be electrically connected to other external circuits or electronic components through the first flexible circuit board 15.

In summary, by disposing the convex part and the concave part, the outer lead bonding regions of the first substrate and the second substrate are not shield by the second substrate and the first substrate, respectively. Thus, the outer lead bonding regions of the first substrate and the second substrate can be integrated on the same fan-out side without changing the manufacturing process, and consequentially the space for the outer lead bonding regions is significantly reduced. Further, because the convex part and the concave part have the arc shapes, the substrates have reduced cut areas and the concave part has reduced stress concentration at the corner. Furthermore, because the sum of the width of the concave part and the width of the concave part 112 is equal to the width of the fan-out side of the touch display apparatus, a maximum wiring space is obtained and layout and the arrangement of the electronic elements in the touch display apparatus have improved convenience.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch display apparatus having a fan-out side, the touch display apparatus comprising:
    a first substrate having a first inner surface, wherein the first inner surface has a first outer lead bonding region on the fan-out side;
    a second substrate disposed opposite to the first substrate and having a second inner surface, wherein the second inner surface faces the first inner surface, the second substrate has a convex part and a concave part on the fan-out side, the convex part and the concave part are adjacent with each other and a width of the convex part and a width of the concave part are both smaller than a width of the fan-out side of the touch display apparatus, the second inner surface has a second outer lead bonding region on the convex part, the first outer lead bonding region of the first substrate is unshielded by the second substrate through the concave part, the convex part protrudes relative to an edge of the first substrate, and the second outer lead bonding region of the second substrate is unshielded by the first substrate;
    a touch sensing element disposed on the second inner surface of the second substrate and electrically connected to the second outer lead bonding region; and
    a display element disposed on the first inner surface of the first substrate and electrically connected to the first outer lead bonding region.

2. The touch display apparatus according to claim 1, wherein the concave part has an arc shape.

3. The touch display apparatus according to claim 1, wherein a first flexible circuit board is electrically connected to the first outer lead bonding region of the first substrate.

4. The touch display apparatus according to claim 1, wherein a second flexible circuit board is electrically connected to the second outer lead bonding region of the second substrate.

5. The touch display apparatus according to claim 1, wherein the first substrate and the second substrate package the touch sensing element and the display element in between the first substrate and the second substrate.

6. A touch display apparatus having a fan-out side, the touch display apparatus comprising:
    a first substrate having a first inner surface, wherein the first inner surface has a first outer lead bonding region on the fan-out side, the first substrate further has at least one first concave part adjacent to the first outer lead bonding region;
    a second substrate disposed opposite to the first substrate and having a second inner surface, wherein the second inner surface faces the first inner surface, the second substrate has second concave part on the fan-out side, the second inner surface has at least one second outer lead bonding region, the first outer lead bonding region of the first substrate is unshielded by the second substrate through the second concave part, and the at least one second outer lead bonding region of the second substrate is unshielded by the first substrate through the at least one first concave part, wherein the first substrate has one first concave part, the first concave part has a first width, the second concave part has a second width, the sum of first width and the second width is smaller than or equal to a width of the fan-out side of the touch display apparatus;
    a touch sensing element disposed on the second inner surface of the second substrate and electrically connected to the at least one second outer lead bonding region; and
    a display element disposed on the first inner surface of the first substrate and electrically connected to the first outer lead bonding region.

7. The touch display apparatus according to claim 6, wherein the at least one first concave part and the second concave part have arc shapes.

8. The touch display apparatus according to claim 6, wherein an orthogonal projection of the first concave part on the second substrate is tangent to the second concave part.

9. The touch display apparatus according to claim 6, wherein the first substrate has two first concave parts, the two first concave parts have a first width and a second width, respectively, the second concave part has a third width, the sum of first width, the second width and the third width is smaller than or equal to a width of the fan-out side of the touch display apparatus.

10. The touch display apparatus according to claim 9, wherein two orthogonal projections of the two first concave parts on the second substrate are tangent to two ends of the second concave part, respectively.

11. The touch display apparatus according to claim 6, wherein the touch display apparatus further comprises a first flexible circuit board electrically connected to the first outer lead bonding region of the first substrate.

12. The touch display apparatus according to claim 6, wherein the touch display apparatus further comprises a second flexible circuit board electrically connected to the at least one second outer lead bonding region of the second substrate.

13. The touch display apparatus according to claim 6, wherein the first substrate and the second substrate package the touch sensing element and the display element in between the first substrate and the second substrate.

* * * * *